(12) United States Patent
Hick (10) Patent No.: US 8,698,624 B2
(45) Date of Patent: *Apr. 15, 2014

(54) OCCUPANCY SENSING WITH SELECTIVE EMISSION

(71) Applicant: Leviton Manufacturing Co., Inc., Melville, NY (US)

(72) Inventor: Robert L. Hick, Newberg, OR (US)

(73) Assignee: Leviton Manufacturing Co., Inc., Melville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/943,223

(22) Filed: Jul. 16, 2013

(65) Prior Publication Data

US 2013/0301390 A1    Nov. 14, 2013

Related U.S. Application Data

(63) Continuation of application No. 13/352,124, filed on Jan. 17, 2012, now Pat. No. 8,502,660, which is a continuation-in-part of application No. 12/258,932, filed on Oct. 27, 2008, now Pat. No. 8,115,626.

(51) Int. Cl.
*G08B 1/08* (2006.01)
*G08B 23/00* (2006.01)

(52) U.S. Cl.
USPC .............. 340/539.22; 340/539.26; 340/539.3; 340/522; 340/527

(58) Field of Classification Search
USPC .............. 340/539.22, 539.3, 545.3, 501–503, 340/571.1, 507, 541–567; 307/112; 367/93–94

See application file for complete search history.

(56) References Cited

U.S. PATENT DOCUMENTS

| | | | |
|---|---|---|---|
| 5,189,393 A | 2/1993 | Hu | |
| 5,489,827 A | 2/1996 | Xia | |
| 5,701,117 A | 12/1997 | Platner et al. | |
| 5,986,357 A | 11/1999 | Myron et al. | |
| 6,222,191 B1 | 4/2001 | Myron et al. | |
| 6,304,180 B1 | 10/2001 | Platner et al. | |
| 6,798,341 B1 | 9/2004 | Eckel et al. | |
| 2006/0187037 A1* | 8/2006 | Eubelen et al. | 340/552 |

FOREIGN PATENT DOCUMENTS

| | | |
|---|---|---|
| JP | 2006127897 A | 5/2006 |
| KR | 10-2001-0077341 A | 8/2001 |
| KR | 10-2005-0028433 B1 | 3/2005 |
| KR | 10-0524233 B1 | 10/2005 |
| KR | 10-0681392 B1 | 2/2007 |
| KR | 10-0750444 B1 | 8/2007 |

OTHER PUBLICATIONS

Leviton Manufacturing Co., Inc., New Multi-Technology Occupancy Sensor Wall Switch Offers Highly-Accurate "Install and Forget" Performance, Apr. 21, 2006, 1 sheet.

(Continued)

*Primary Examiner* — Steven Lim
*Assistant Examiner* — Omeed Alizada
(74) *Attorney, Agent, or Firm* — Marger Johnson & McCollom PC (57) ABSTRACT

A method includes energizing an ultrasound driver to emit ultrasonic energy in a space, sensing ultrasonic energy within the space, determining an occupancy condition of the space in response to sensing ultrasonic energy reflected from the ultrasound driver, and determining the occupancy condition of the space in response to sensing ultrasonic energy in the space that was not emitted by the ultrasound driver.

13 Claims, 7 Drawing Sheets

(56) References Cited

OTHER PUBLICATIONS

Leviton Manufacturing Co., Inc. OSSMT Application Notes, Apr. 21, 2006, 1 sheet.
Leviton Manufacturing Co., Inc. Multi-Technology Wall Switch Occupancy Sensor, OSSMT-MD, Apr. 21, 2006, 4 sheets.
Leviton Manufacturing Co., Inc. Application Note for OSSMT Multi-Tech Wall Box Sensor: Bathroom Installations, Apr. 21, 2006, 1 sheet.
Bennett Liles, Sound and Video Contractor, Technology Showcase: Electronic White Boards, Mar. 1, 2004, 5 pages.
International Search Report and Written Opinion for PCT/US2009/062118, dated Jun. 1, 2010, 10 pages.

* cited by examiner

OCCUPANCY SENSING WITH SELECTIVE EMISSION

RELATED APPLICATIONS

This application is a Continuation of U.S. patent application No. 13/352,124, titled Occupancy Sensing with Selective Emission filed on Jan. 17, 2012, which is a Continuation-in-Part of U.S. patent application Ser. No. 12/258,932 titled Occupancy Sensing with Selective Emission filed Oct. 27, 2008, which are incorporated by reference.

BACKGROUND

Occupancy sensors are used to monitor the presence of human occupants in indoor and outdoor spaces. Occupancy sensors conserve energy by automatically turning off lighting and other electrical loads for a space when the space is unoccupied. Occupancy sensors also perform a convenience function by automatically turning on lighting and other loads when an occupant enters a given space.

Sensing technologies used with occupancy sensors can generally be characterized as either active or passive technologies. Passive technologies do not involve the active emission of any type of energy in the monitored space. Instead, passive technologies rely on the detection of energy given off by the occupants themselves, or reflected by the occupants from ambient sources. An example of a passive occupancy sensing technology is passive infrared (PR) sensing. PIR sensing relies on the fact that the thermal energy of warm objects causes them to emit infrared radiation. The infrared radiation is sensed by a photocell which converts the radiation to electric signals for further processing. Another type of passive occupancy sensing technology is video sensing which relies on ambient light that is reflected by an occupant and detected by a video sensor such as a charge coupled device (CCD).

With active technologies, some type of energy is emitted in the monitored space. The emitted energy is reflected by an occupant and converted into an electric signal by a suitable sensor. An example of an active occupancy sensing technology is ultrasonic sensing. In an ultrasound system, the monitored space is flooded with ultrasonic waves that are constantly emitted by an ultrasound driver. An ultrasound sensor detects waves that are reflected by an occupant and/or other objects in the monitored space. By comparing the emitted and reflected waves, an ultrasonic system can determine whether an object is moving. Moving objects are assumed to be occupants.

Some occupancy sensors use a combination of sensing technologies. For example, PR is generally more accurate for detecting large motion such as a person walking into a room in a path that is directly within the line-of-sight of the occupancy sensor. Ultrasound systems tend to be more sensitive for detecting small motion, such as a person working at a desk, and motion that is hidden from the line-of-sight of the occupancy sensor, such as behind partitions in an office or restroom. The added sensitivity, however, may cause false occupied readings. Therefore, an occupancy sensor may initially use only PIR sensing to determine that the monitored space has become occupied. Once the space is initially determined to be occupied, an occupied reading from either PIR or ultrasound may be used to determine that the space continues to be occupied. A countdown timer is typically used to keep the lights on only for a predetermined period of time unless occupancy is sensed again during the countdown time. The countdown timer is reset to a predetermined value (typically 10-30 minutes) when occupancy is initially sensed and the lights are turned on. The timer then continues to decrement toward zero. Each occupied reading from either PIR or ultrasound causes the timer to reset to the maximum value. If the timer decrements all the way to zero before another occupancy event is detected, the lights are turned off, and the sensor returns to the PIR only sensing mode.

DETAILED DESCRIPTION

Figure 1:
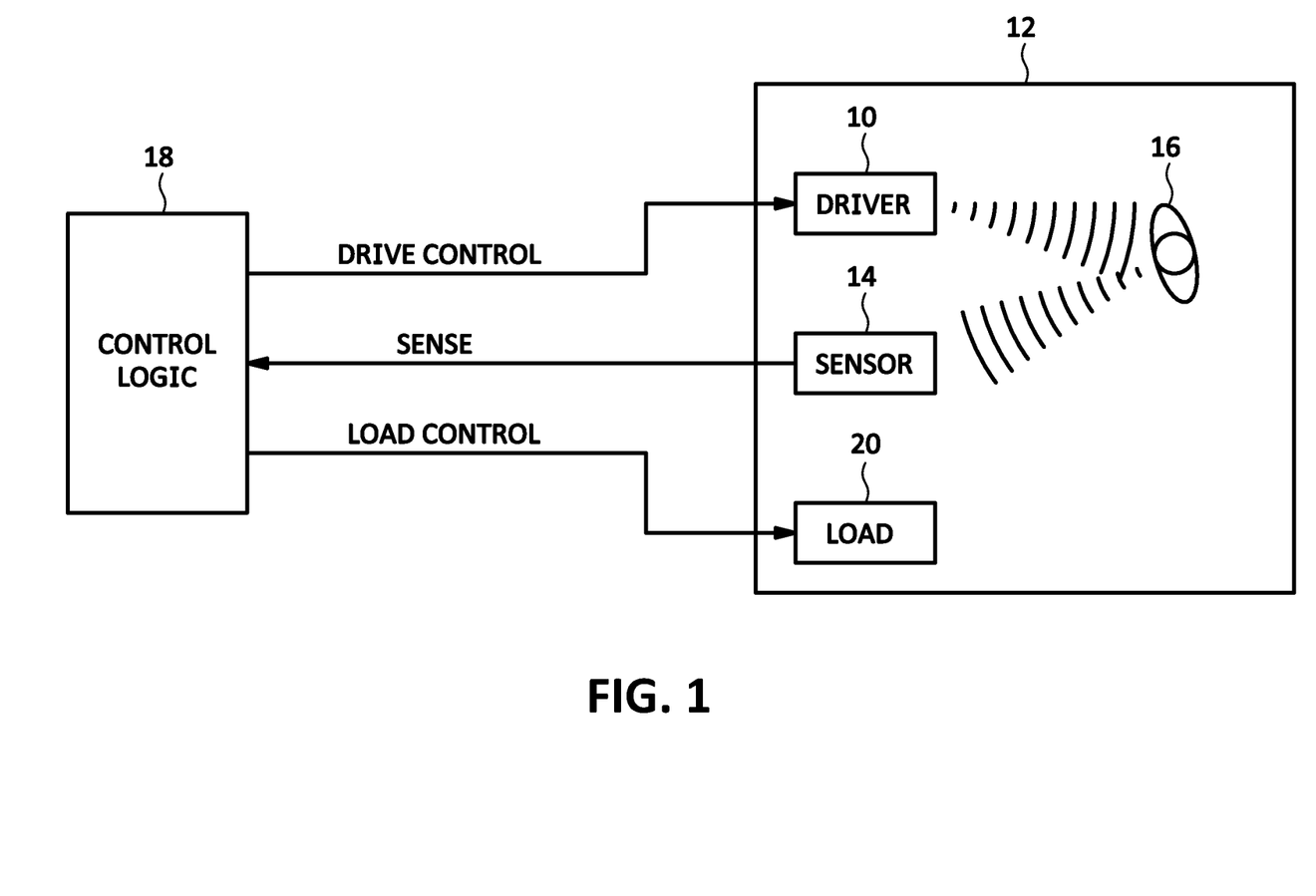
FIG. 1 illustrates an embodiment of an occupancy sensing system according to some inventive principles of this patent disclosure.

FIG. 1 illustrates an embodiment of an occupancy sensing system according to some inventive principles of this patent disclosure. The embodiment of FIG. 1 includes a driver 10 to emit energy in a monitored space 12 in response to a drive control signal. The energy may be in any form suitable for occupancy sensing such as ultrasonic waves, infrared light, visible light, microwaves, electrostatic energy, or any other form of waves, rays, pulses, particles, etc. A sensor 14 outputs a sense signal in response to some of the energy reflected within the space. For example, energy may be reflected by an occupant 16, if any, or from walls, furniture, moving air masses, etc. The sensor 14 is sensitive to the particular type or types of energy emitted by the driver 10. For example, in one embodiment, the driver may emit ultrasonic waves, and the sensor 14 may be an ultrasound transducer that converts reflected ultrasound waves into electrical signals. In another embodiment, the driver 10 may emit infrared radiation to illuminate the space with light that is not visible to the human eye, and the sensor 14 may be a video camera that is sensitive to infrared wavelengths.

The system of FIG. 1 also includes control logic 18 to determine the occupancy condition of the space in response to the reflected energy sensed by the sensor 14, and to control an electrical load 20 for the space 12 in response to the occupancy condition. The control logic 18 may selectively de-energize the driver 10. That is, the driver may be de-energized by the control logic at times other than when the control logic itself and/or the entire system is powered down. For example, the control logic 18 may de-energize the driver 10 whenever the load 20 is de-energized. As another example, the control logic 18 may de-energize the driver 10 when potentially interfering energy is sensed in the space 12. The driver may be de-energized completely, for example, by completely disconnecting the driver from a source of power, or by switching the drive control signal to a state that disables the driver. The driver may also be de-energized partially, for example, by reducing its energy emission to a level adequate to substantially reduce energy consumption or to substantially reduce or eliminate interference with other devices that may utilize or be sensitive to the type or types of energy emitted by the driver.

An embodiment of an occupancy sensing system according to the inventive principles of this patent disclosure may utilize only a single type of active occupancy sensing technology as shown in FIG. 1, or it may include apparatus and/or software to implement one or more additional active or passive occupancy sensing technologies in combination with the first type of active occupancy sensing.

The control logic 18 may be implemented in hardware, software or any combination thereof. The control logic may include one or more microprocessors or microcontrollers, discrete logic, analog circuitry, or any other suitable apparatus and/or software to implement any of the sensing and/or control schemes according to the inventive principles of this patent disclosure.

The connections between the control logic 18 and the driver 10, load 20 and sensor 14 may be in any suitable form. Hardwired connections may include screw or spring terminals, pigtail leads, printed circuit (PC) board traces, etc. Wireless connections may include signaling media such as radio frequency (RF), infrared (IR), optical, etc. Signaling modes for wired or wireless connections may be analog, digital, hybrid, etc., at any suitable voltages, currents, optical power levels or wavelengths, RF power levels or frequencies, etc.

The control logic 18 may control power to the load 20 directly, or through a load control circuit which may be integral with the control logic, integral with the load, or distributed between both. Alternatively, the load control circuit may be embodied as one or more components separate from both the control logic and the load.

In some embodiments, the load control signal may deliver power to the load. For example, the load control signal may operate at 115 VAC to provide power to a lighting load or fan. In other embodiments, the load control signal may only perform a signaling function. For example, the load control signal may be implemented as a hardwired low-voltage digital signal to communicate with a heating ventilation and air conditioning (HVAC) system, a lighting control system, or any other type of system.

The components shown in FIG. 1 may be arranged in any physical relation to the space 12 and to each other. Any or all of the components may be located in, near, or remote from the space. For example, electrical lighting loads may typically be located in or just above the space, whereas an exhaust fan or air conditioning (A/C) load may be located remotely from the space. The control logic 18, driver 10 and sensor 14 may be arranged in any combination of common or separate locations and in common or separate enclosures, if any. For example, in one embodiment, the control logic, driver and sensor may be located in a common wall switch enclosure that includes power control circuitry for controlling the load. In another embodiment, the driver and sensor may be located in a separate enclosure that is mounted remotely from the control logic. In yet another embodiment, the control logic, driver and sensor may be located in a ceiling mount or wall/corner mount enclosure that sends low-voltage control signals to a relay cabinet or other apparatus for controlling the power to the load.

Figure 2:
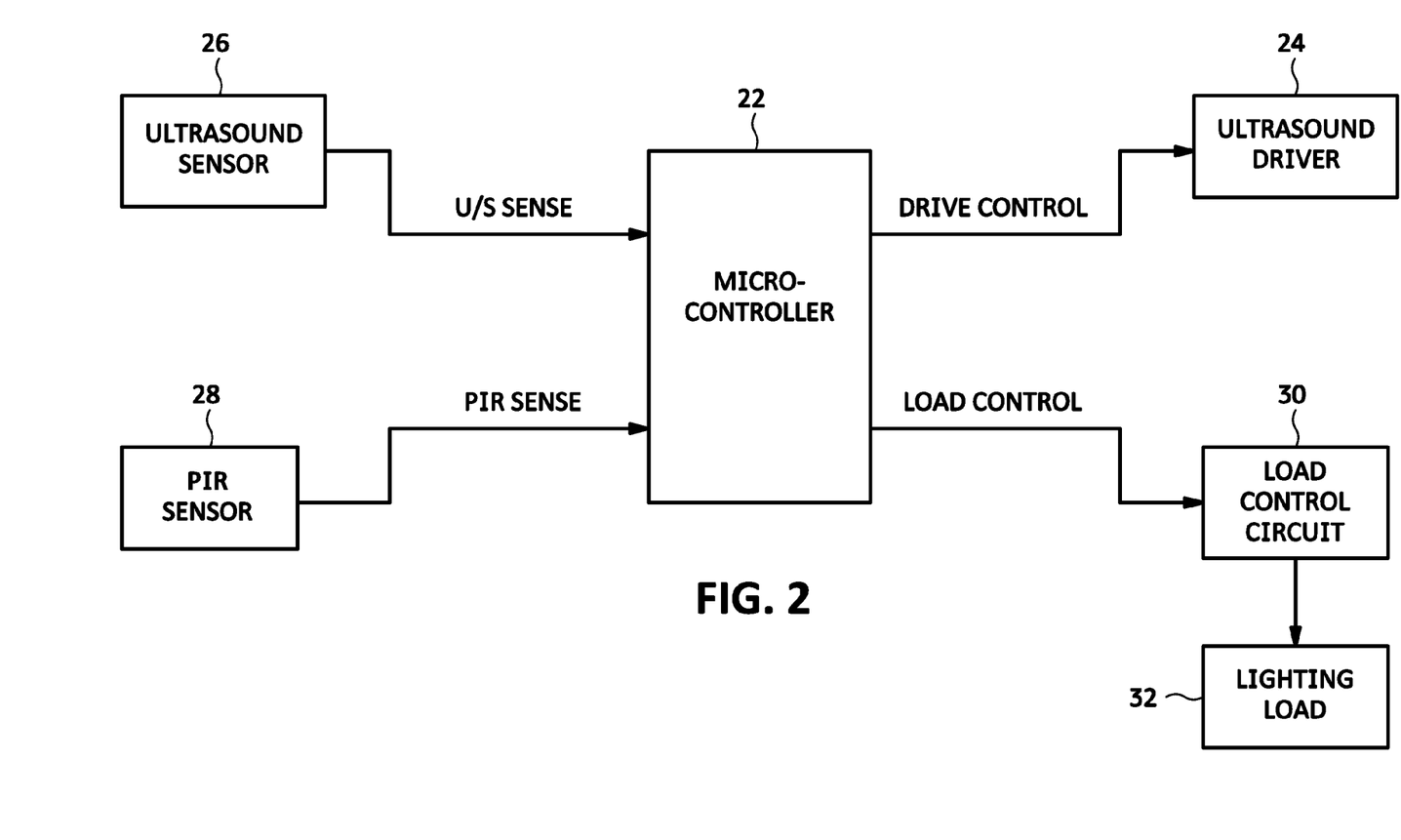
FIG. 2 illustrates another embodiment of an occupancy sensing system according to some inventive principles of this patent disclosure.

FIG. 2 illustrates another embodiment of an occupancy sensing system according to some inventive principles of this patent disclosure. For purposes of illustration, the embodiment of FIG. 2 is described in the context of a lighting control system that includes active ultrasound sensing and passive infrared (PIR) sensing, but the inventive principles are not limited to these implementation details.

The system of FIG. 2 includes a microcontroller 22 to provide centralized control and monitoring of the system. A driver 24 may include a transducer and associated drive circuitry arranged to emit sound waves into the monitored space at ultrasonic frequencies in response to a drive control signal from the microcontroller 22. The driver may be energized and de-energized in numerous manners according to some of the inventive principles of this patent disclosure. For example, the driver may be turned full-on at a fixed output power level or full-off in a digital manner. Alternatively, the driver may be energized or de-energized to any intermediate power level. The driver may be controlled to emit ultrasound energy at any fixed frequency, or at any combination of modulated frequencies. The transition between power levels, frequencies, or both, may be made in abrupt steps, or may be ramped to provide smooth transitions between states. For example, when the driver is energized, the power, frequency, or both may be ramped gradually to reduce or eliminate an audible clicking or chirping noise that may otherwise result from the sudden energizing of the driver.

A sensor 26 may include another transducer to convert ultrasound waves received from the monitored space into an electric signal. The sensor 26 may also include associated circuitry to process the signal from the transducer to detect the presence of ultrasound energy, for example from another source of ultrasound energy in the monitored space. The sensor 26 may also include circuitry to process the signal from the transducer to detect the presence of an occupant in the space. For example, in an embodiment that utilizes the Doppler Effect to detect motion of an occupant, the circuitry may include a demodulator to detect frequency and/or phase shift of the ultrasound signal emitted by the driver 24 and reflected by the occupant in the monitored space. In some embodiments, the same circuitry may be used to perform any or all of these functions, while in other embodiments, separate circuits may be utilized.

The embodiment of FIG. 2 also includes passive infrared circuitry 28 to generate a PIR sense signal in response to infrared radiation received from the monitored space by a photocell. A load control circuit 30 controls the lighting load 32 in response to a load control signal from the microcontroller 22.

The embodiment of FIG. 2 provides a versatile platform for implementing numerous methods according to some of the inventive principles of this patent disclosure. The microcontroller 22 may be programmed to perform actions at specified times and/or in response to various user inputs or sensed conditions. Some example embodiments of methods implemented with the system of FIG. 2 are described below, but the inventive principles are not limited to these specific details, or to the platform of FIG. 2.

Figure 3:
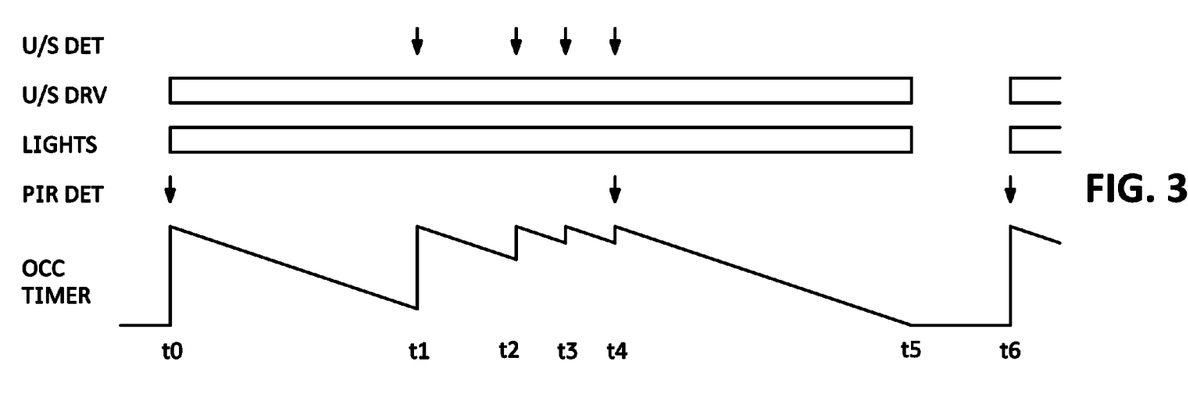
FIG. 3 illustrates an embodiment of an occupancy sensing method according to some inventive principles of this patent disclosure.

FIG. 3 illustrates an embodiment of a method according to some inventive principles of this patent disclosure. FIG. 3 illustrates various states, events and/or actions of the system as time progresses along the horizontal axis. The line OCC TIMER represents the state of a delay timer which counts down from a maximum (reset) value of 100 percent down to zero percent. When OCC TIMER reaches zero, the lights are turned off. If implemented with the system of FIG. 2, OCC TIMER may be embodied as a digital word that is reset and decremented by the microcontroller, or as a separate timer circuit in the microcontroller. In an analog implementation, OCC TIMER may be embodied as a voltage on a capacitor that is discharged by a constant current.

The symbol ↓ in the PIR DET line indicates when the signal from the passive infrared circuit indicates that large motion has been detected. The symbol ↓ in the U/S DET line indicates when the signal from the ultrasound sensor indicates that small motion has been detected.

The line LIGHTS indicates the state of the lights where a solid bar indicates that the lights are on. The line U/S DRV indicates the state of the ultrasound driver. In this embodiment, the ultrasound drive is assumed to be either full on (indicated by a solid bar) or full off, but other states of the driver are possible according to the inventive principles of this patent disclosure. Likewise, the lights or other electrical loads may be controlled to states other than full on or full off.

Referring again to FIG. 3, prior to time t0, the lights are off, the OCC TIMER is at zero, and the ultrasound drive has been de-energized. In this state, the system waits for the PR DET signal to indicate that large movement is sensed. At time t0, large movement is sensed, which may be caused, for example, by an occupant entering the space. This causes the system to turn the lights on, reset OCC TIMER to 100 (percent), and energize the ultrasound driver. OCC TIMER continues to decrement until time t1 when the ultrasound sensor detects small motion. This causes the system to reset OCC TIMER. Two more small movements are detected at times t2 and t3 which causes the system to reset OCC TIMER in response to both events. A time t4, both PR DET and U/S DET indicate that motion is sensed, which may indicated that the occupant has left the space. At time t5, OCC TIMER reaches zero without any further detection of large or small motion, so the system turns off the lights and de-energizes the ultrasound driver. The lights remain off, and the ultrasound remains de-energized until time t6 when the PR DET signal indicates that large movement is sensed.

Because the ultrasound driver is de-energized during unoccupied periods, energy may be conserved because no energy or reduced energy is emitted into the monitored space during periods in which the space is known to be unoccupied. This may also prolong the life of the ultrasound driver.

Figure 4:
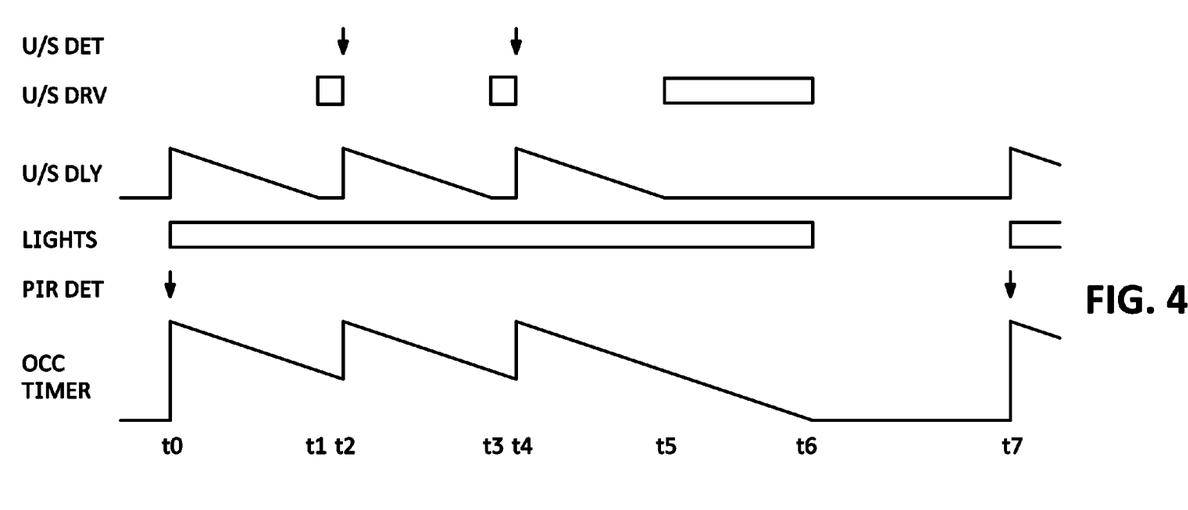
FIG. 4 illustrates another embodiment of an occupancy sensing method according to some of the inventive principles of this patent disclosure.

FIG. 4 illustrates another embodiment of a method according to some inventive principles of this patent disclosure. In the embodiment of FIG. 4, the ultrasound driver is not energized immediately upon detection of a large motion, but instead is left de-energized until after a time delay $T_D$ that is typically shorter than the reset value of the occupancy countdown timer. The line U/S DLY in FIG. 4 indicates the state of the time delay. Since the passive infrared sensor has detected a large movement, the ultrasound sensor is not needed to detect small movement immediately. In this embodiment, the time delay is set to roughly half the length of the countdown timer, but any other suitable time delay can be used. After the time delay, the ultrasound driver is energized to enable the ultrasound sensor to detect small motion and reset the countdown timer OCC TIMER prior to the countdown timer reaching zero indicating that the space is unoccupied.

Referring to FIG. 4, prior to time t0, the lights and ultrasound driver are both off. At time t0, the PR DET signal indicates that a large movement is detected. Therefore, OCC TIMER is reset, and the lights are turned on. The ultrasound driver, however, is left off for a time delay of $T_D$ beginning at time t0. At time t1, the time delay is complete and the ultrasound driver is turned on. At time t2, the U/S DET signal indicates that a small movement has been detected, so OCC TIMER is reset and the ultrasound driver is turned off again for another time delay $T_D$ which ends at t3. The ultrasound driver is turned on at t3, and at t4, the U/S DET signal again indicates that a small movement has been detected, so OCC TIMER is again reset and the ultrasound driver is turned off again for another time delay $T_D$ which ends at t5. The ultrasound driver is turned on at t5, but no further movement is indicated by either the PIR or U/S DET signals before OCC TIMER reaches zero, so the lights and ultrasound driver are both turned off at time t6. Both are left off until another large movement is indicated by the PIR signal at t7.

As is apparent from FIG. 4, the ultrasound driver spends a greater amount of time in the de-energized state. This may reduce power consumption and/or prolong the life of the ultrasound driver. Moreover, reducing the amount of time the ultrasound driver spends in the energized state may reduce or eliminate potentially harmful interference with other devices such as electronic white boards, hearing aids, etc., that utilize or are sensitive to, ultrasonic energy.

Figure 5:
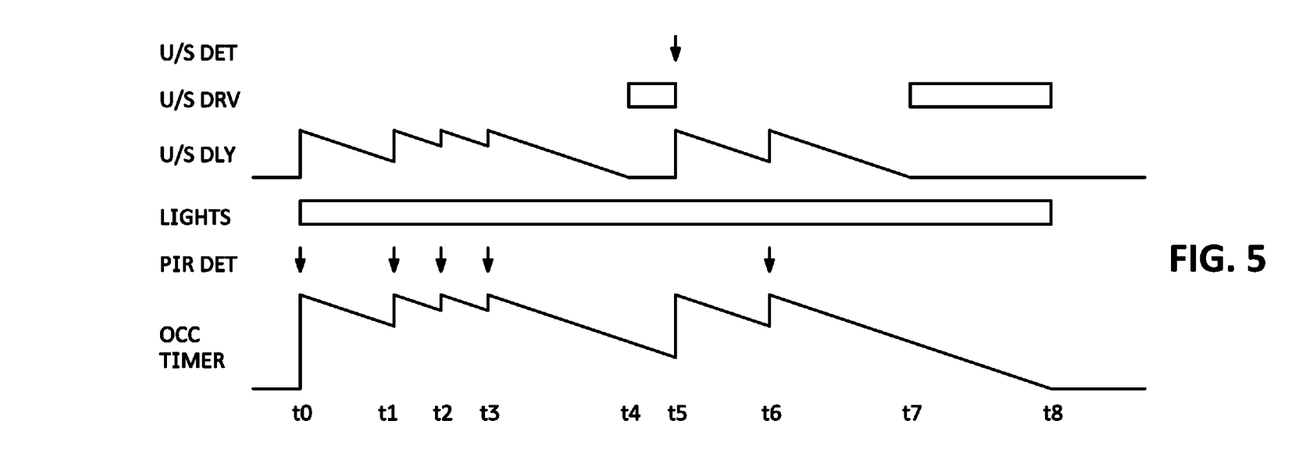
FIG. 5 illustrates another embodiment of an occupancy sensing method according to some of the inventive principles of this patent disclosure.

FIG. 5 illustrates another embodiment of a method according to some inventive principles of this patent disclosure. The embodiment of FIG. 4 is similar to that of FIG. 4 but shows how the PIR sensor may preempt the time delay $T_D$ for turning the ultrasound driver on. At time to, the PIR signal indicates that a large movement is detected, and therefore, OCC TIMER is reset, the lights are turned on, and the time delay $T_D$ for turning the ultrasound sensor on begins as shown in the line U/S DLY. Before the time delay expires, however, the PIR signal indicates another large movement at time t1. Therefore, both the countdown timer OCC TIMER and U/S DLY are reset, and the ultrasound driver remains de-energized. Additional large motions are detected at t2 and t3 which preempt the time delay $T_D$ and reset U/S DLY. At time t4, the time delay $T_D$ finally expires before a large movement is detected, and therefore, the ultrasound driver is energized. Shortly thereafter, at time t5, the U/S DET signal indicates a small movement has been detected, so OCC TIMER and U/S DLY are both reset, and the ultrasound drive is de-energized. Another large movement is detected at time t6, so OCC TIMER and U/S DLY are both reset. The time delay $T_D$ expires at t7 at which time the ultrasound driver is energized. No further movement is indicated by either the PIR or U/S DET signals before OCC TIMER reaches zero, so the lights and ultrasound driver are both turned off at time t8.

From FIG. 5 it is apparent that this embodiment may further reduce the amount of time the ultrasound driver is energized.

Figure 6:
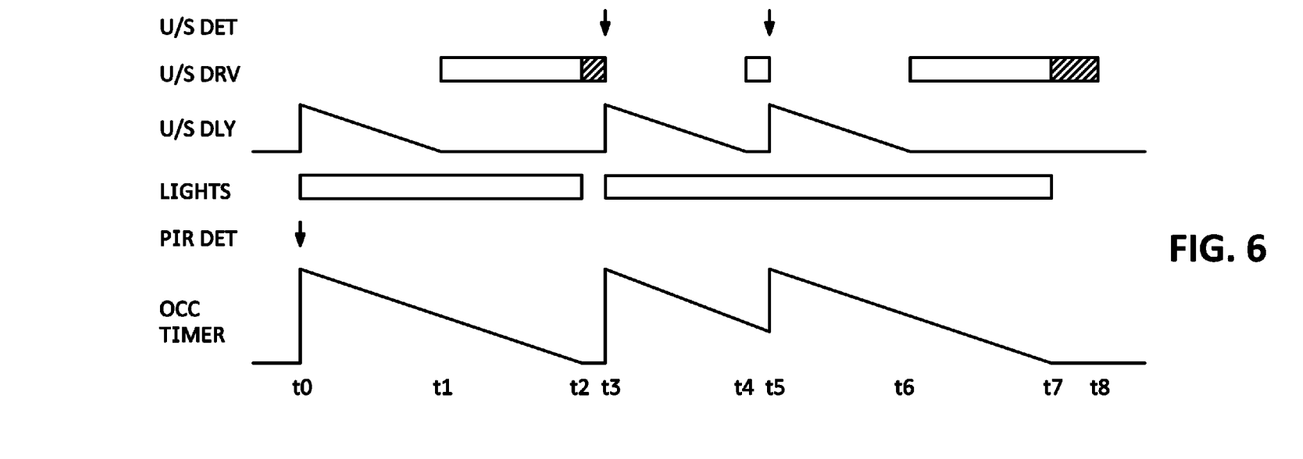
FIG. 6 illustrates another embodiment of an occupancy sensing method according to some of the inventive principles of this patent disclosure.

FIG. 6 illustrates another embodiment of a method according to some inventive principles of this patent disclosure. In the embodiment of FIG. 6, the ultrasound driver is left on for a short period of time, e.g. a few seconds, immediately after the lights are turned off. This enables the ultrasound sensor to continue detecting reflected energy that would indicate small movements, for example, an occupant waving his or her arms to turn the lights back on after a false determination of an unoccupied state.

Referring to FIG. 6, the PIR signal indicates a large movement at time to, thus the lights are turned on and OCC TIMER and U/S DLY are reset. At time t1, the U/S DLY reaches zero, and the ultrasound driver is energized. No large or small movements are detected before OCC TIMER reaches zero, so the lights are turned off at time t2. The ultrasound driver, however, remains energized as shown in the shaded area long enough to detect a small motion at time t3. Therefore, the lights are turned back on, and OCC TIMER and U/S DLY are reset. At time t4, the U/S DLY reaches zero, and the ultrasound driver is energized. Another small motion is detected at t5, and therefore, OCC TIMER and U/S DLY are reset. At time t6, U/S DLY reaches zero, and the ultrasound driver is energized. No large or small movements are detected before OCC TIMER reaches zero, so the lights are turned off at time t7. The ultrasound driver remains energized again as shown in the shaded area. This time, however, no small motion is detected during the predetermined short time period, and therefore, the lights remain off until another large motion is detected by the PIR sensor.

Figure 7:
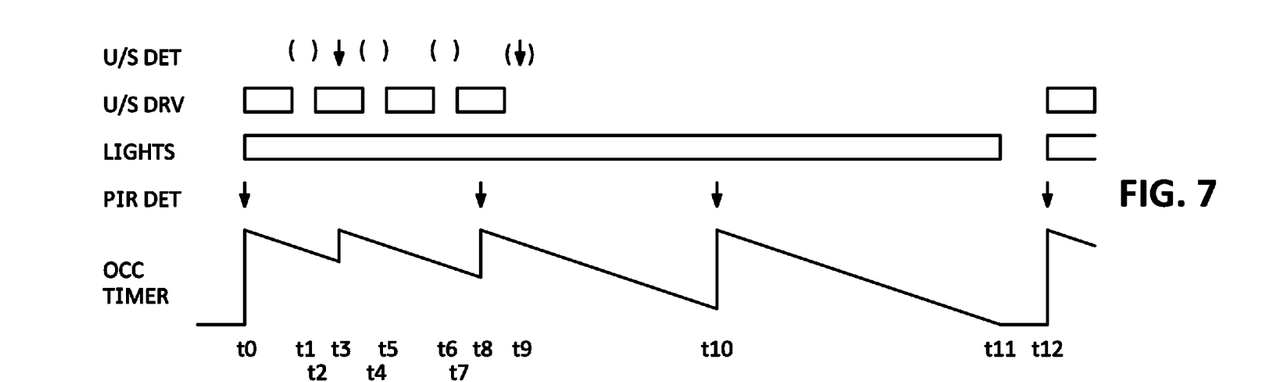
FIG. 7 illustrates another embodiment of an occupancy sensing method according to some of the inventive principles of this patent disclosure.

FIG. 7 illustrates another embodiment of a method according to some inventive principles of this patent disclosure. In the embodiment of FIG. 7, the ultrasound driver is periodically de-energized to enable the ultrasonic sensor to detect the presence of ultrasound energy that was not emitted by the ultrasound driver. The presence of ultrasound energy that was not emitted by the ultrasound driver may indicate the presence of other devices that utilize ultrasound technology, for example, an electronic whiteboard, ultrasonic medical equipment, etc. In one example embodiment, the driver may be energized for one minute, then de-energized for one second to listen for other sources of ultrasound. Other time periods may be used in accordance with the inventive principles of this patent disclosure.

In FIG. 7, the symbol ( ) in the U/S DET line indicates when the signal from the ultrasound sensor is checked to see if it has detected energy that was not emitted by the ultrasound driver. The symbol (↓) in the U/S DET line indicates energy that was not emitted by the ultrasound driver has been detected.

Referring to FIG. 7, the PIR signal indicates a large movement at time to, thus the lights are turned on, OCC TIMER is reset, and the ultrasound driver is energized for a predetermined period of time. This may be associated, for example, with an occupant entering a room. After the driver is de-energized, the U/S DET signal is checked at t1 to determine if there are any other ultrasound sources in the space. No other sources are detected, so the ultrasound driver is energized again at t2. A small movement is detected at t3, and OCC TIMER is reset. This may be associated, for example, with the occupant working at a desk or conference table. No other ultrasound sources are detected at two additional de-energize and sense cycles at times t4 and t6. A large movement is detected by the PIR sensor at t8, and therefore, OCC TIMER is reset. This large movement may be associated, for example, with a second occupant entering the room. At time t9, the U/S DET signal is checked to determine if there are any other ultrasound sources in the space. This time, the U/S DET signal indicates the presence of another source of ultrasound energy in the space. This may be associated, for example, with the first and second occupants using an electronic white board. Therefore, the ultrasound driver is maintained in a de-energized state for the remainder of the time during which the space is determined to be occupied. At time t10, another large movement is detected, and OCC TIMER is reset. This may be associated, for example, with both occupants leaving the room. OCC TIMER reaches zero at time t11, at which time the lights are turned off, and the system waits to detect another large movement.

Thus, the embodiment of FIG. 7 may reduce or eliminate potential interference between the occupancy sensor and other apparatus that utilizes ultrasound energy.

Figure 8:
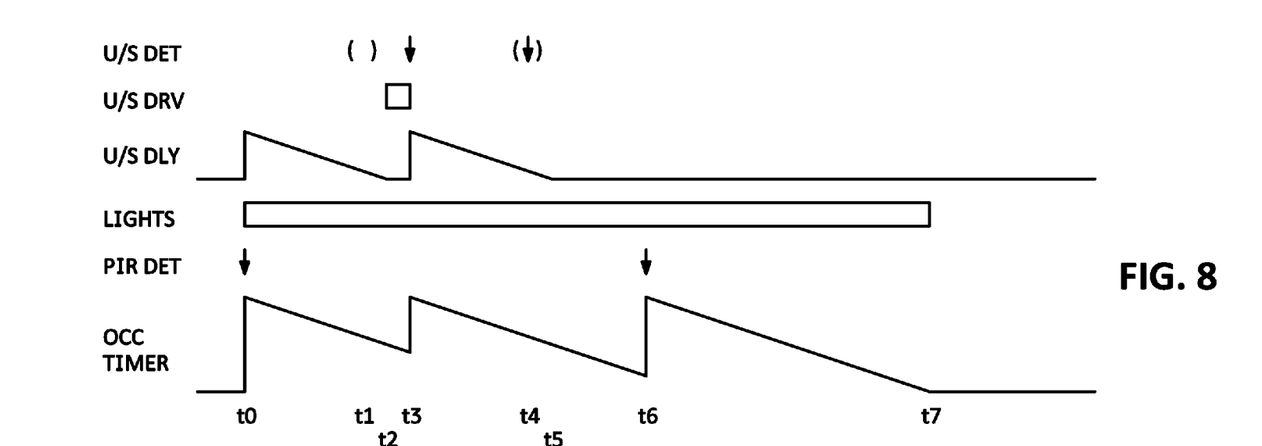
FIG. 8 illustrates another embodiment of an occupancy sensing method according to some of the inventive principles of this patent disclosure.

FIG. 8 illustrates another embodiment of a method according to some inventive principles of this patent disclosure. In the embodiment of FIG. 8, the system checks for the presence of other sources of ultrasound energy in the monitored space before the ultrasound drive is ever energized.

Referring to FIG. 8, the PIR signal indicates a large movement at time t0, thus the lights are turned on and OCC TIMER and U/S DLY are reset. Before U/S DLY reaches zero, the U/S DET signal is checked at time t1 to determine the presence of ultrasound energy that was not emitted by the ultrasound driver. In this example, none is detected at t1, so the ultrasound driver is energized at time t2 when U/S DLY reaches zero. The U/S DET signal indicates a small movement at time t3, and therefore, OCC TIMER and U/S DLY are reset. Before U/S DLY reaches zero again, the U/S DET signal is checked again at time t4 to determine the presence of other sources of ultrasound energy in the monitored space. This time, ultrasound energy that was not emitted by the ultrasound driver is detected, indicating the possible presence of potentially interfering energy. Therefore, the ultrasound driver is disabled for the remainder of the occupied period, or any other suitable length of time.

From FIG. 8 it is apparent that this embodiment may provide even better protection from harmful interference, more power savings, etc.

Figure 9:
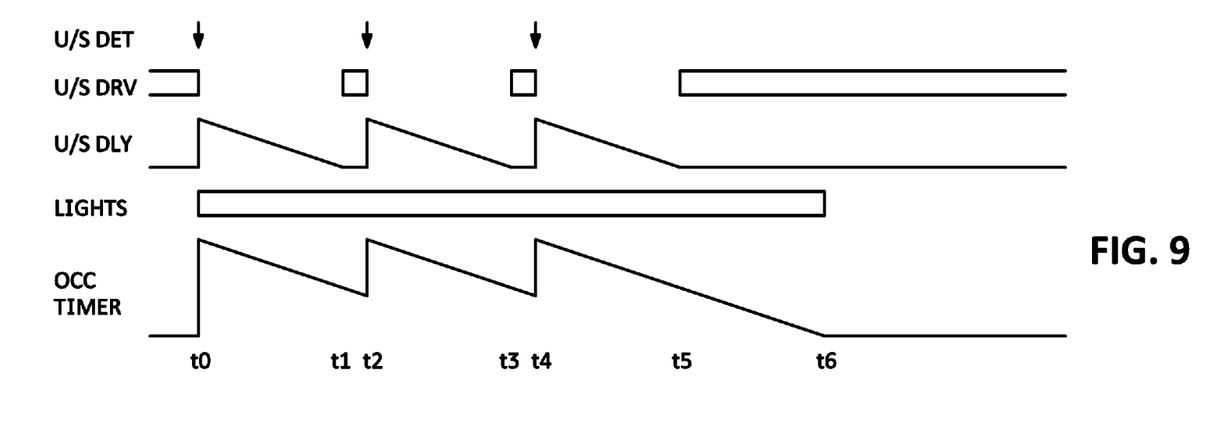
FIG. 9 illustrates another embodiment of an occupancy sensing method according to some of the inventive principles of this patent disclosure.

FIG. 9 illustrates another embodiment of a method according to some inventive principles of this patent disclosure. The embodiment of FIG. 9 is an ultrasound-only implementation. Therefore, the ultrasound driver is energized during all, or any suitable portion of a period during which the space is determined to be unoccupied. In one possible embodiment, the driver may remain energized during the entire unoccupied period. In other possible embodiments, the driver may be alternately de-energized, then energized for short periods of time to check for movement indicating the presence of an occupant.

Referring to FIG. 9, the ultrasound driver is energized prior to t0 at which time a motion is indicated by the U/S DET signal. Therefore, the lights are turned on, and OCC TIMER and U/S DLY are reset. At time t1, U/S DLY reaches zero, and the ultrasound driver is energized. Motion is detected at t2, at which time OCC TIMER and U/S DLY are reset. The ultrasound driver is energized again at t3 and motion is detected at t4, thus, OCC TIMER and U/S DLY are reset again. At time t5, U/S DLY reaches zero and the ultrasound driver is energized. This time, no motion is detected before OCC TIMER reaches zero at time t6, and therefore the lights are turned off. In this example, the ultrasound driver remains continuously energized after the lights are turned off, but as discussed above, the ultrasound driver may be periodically energized and de-energized during an unoccupied period.

From FIG. 9 it is apparent that, even in an ultrasound-only embodiment, some of the inventive principles of this patent disclosure may enable a reduction in power consumption.

Figure 10:
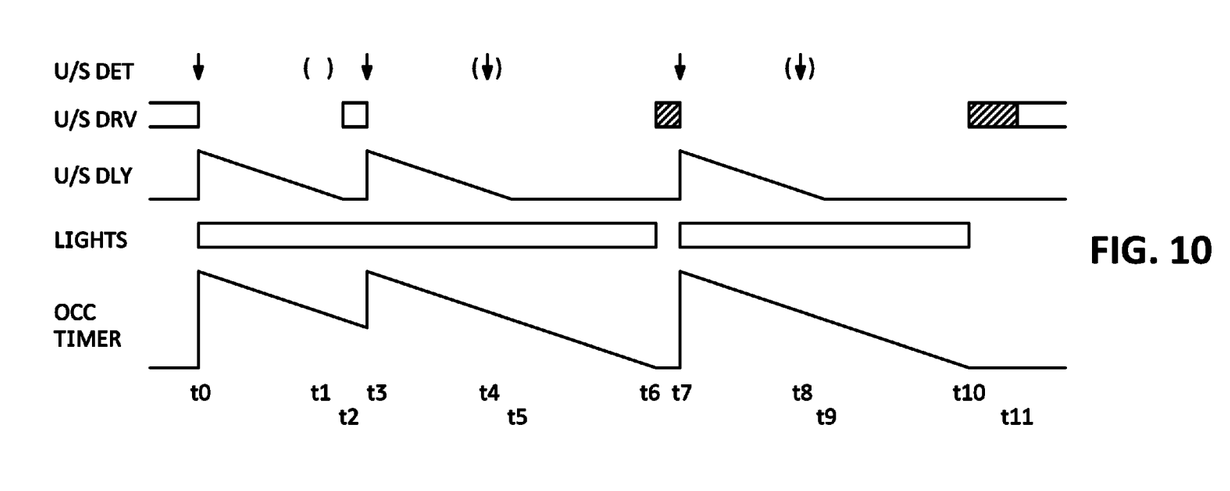
FIG. 10 illustrates another embodiment of an occupancy sensing method according to some of the inventive principles of this patent disclosure.

FIG. 10 illustrates another embodiment of a method according to some inventive principles of this patent disclosure. The embodiment of FIG. 10 is another ultrasound-only implementation. In this embodiment, however, the system checks for the presence of other sources of ultrasound energy in the monitored space prior to energizing the ultrasound driver during an occupied period. This embodiment also energizes the driver for a short time period immediately after the lights are turned off to detect small motions that may signify a false determination that the space is unoccupied. Although this short time period may be merged with the normal energizing of the driver during an unoccupied time in an ultrasound-only embodiment, there may be differences in the detection threshold. For example, the system may have a low threshold (high sensitivity) to look for a small movement during the short time period immediately after turning the lights off, but thereafter, a higher threshold may be required to indicate a large movement needed to turn the lights back on.

Referring to FIG. 10, the ultrasound driver is energized prior to t0 at which time a motion is indicated by the U/S DET signal. Therefore, the lights are turned on, and OCC TIMER and U/S DLY are reset. Before U/S DLY reaches zero, however, the U/S DET signal is checked at time t1 to determine the presence of ultrasound energy that was not emitted by the ultrasound driver. In this example, none is detected at t1, so the ultrasound driver is energized at time t2 when U/S DLY reaches zero. The U/S DET signal indicates movement at time t3, and therefore, OCC TIMER and U/S DLY are reset. Before U/S DLY reaches zero again, the U/S DET signal is checked again at time t4 to determine the presence of other sources of ultrasound energy in the monitored space. This time, ultrasound energy that was not emitted by the ultrasound driver is detected, indicating the possible presence of potentially interfering energy. Therefore, the ultrasound driver is de-energized for the remainder of the occupied period, or any other suitable length of time. In this example, the ultrasound driver is de-energized until OCC TIMER reaches zero at t6, at which time the lights are turned off, but the ultrasound driver is energized to enable the ultrasound sensor to detect small movements which would indicate a false determination of an unoccupied condition. Such a small movement is detected at time t7, and therefore, the lights are turned back on, and OCC TIMER and U/S DLY are reset. The presence of other sources of ultrasound energy are again detected at time t8, so the driver remains de-energized until OCC TIMER reaches zero and the lights are turned off at time t10. The ultrasound driver is energized again for a short false-unoccupied detection period. No small movement is detected during the short time period, and therefore, at time t11, the occupancy sensor enters the normal unoccupied mode.

Figure 11:
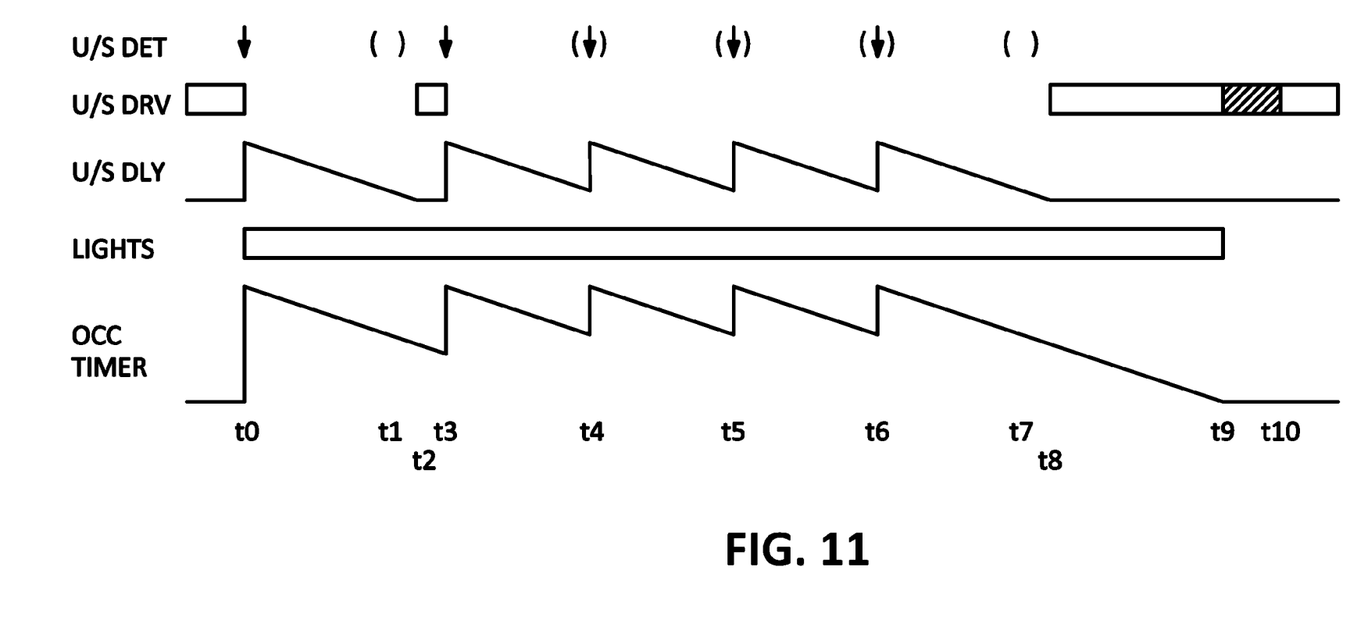
FIG. 11 illustrates another embodiment of an occupancy sensing method according to some of the inventive principles of this patent disclosure.

FIG. 11 illustrates another embodiment of a method according to some inventive principles of this patent disclosure. The embodiment of FIG. 11 is another ultrasound-only implementation, and like the embodiment of FIG. 10, it checks for the presence of other sources of ultrasound energy in the monitored space while the ultrasound driver is de-energized. However, with the embodiment of FIG. 11, the presence of ultrasound energy from other sources is used to indicate that the monitored space is occupied, for example, by one or more occupants using an ultrasonic white board, hearing aid, etc.

Referring to FIG. 11, the ultrasound driver is energized prior to t0 at which time a motion is indicated by the U/S DET signal. Therefore, the lights are turned on, and OCC TIMER and U/S DLY are reset. Before U/S DLY reaches zero, however, the U/S DET signal is checked at time t1 to determine the presence of ultrasound energy that was not emitted by the ultrasound driver. In this example, none is detected at t1, so the ultrasound driver is energized at time t2 when U/S DLY reaches zero. The U/S DET signal indicates movement at time t3, and therefore, OCC TIMER and U/S DLY are reset. Before U/S DLY reaches zero again, the U/S DET signal is checked again at time t4 to determine the presence of other sources of ultrasound energy in the monitored space. As with the embodiment of FIG. 10, ultrasound energy that was not emitted by the ultrasound driver is detected, and therefore, the ultrasound driver is not energized so as to prevent interference with the other source or sources of ultrasound energy. In the embodiment of FIG. 11, however, the presence of another source of ultrasound energy is interpreted as an indication that the monitored space is occupied by one or more occupants that may be using an electronic white board, hearing aid, or other source of ultrasound energy. Therefore, at time t4 in FIG. 11, OCC TIMER and U/S DLY are reset, and the lights are left on. Before U/S DLY reaches zero again, the U/S DET signal is checked again at time t5 to determine the continued presence of other sources of ultrasound energy in the monitored space. Another source of ultrasound energy is detected again, so OCC TIMER and U/S DLY are reset again and the lights remain on. At time t6 the system detects other sources of ultrasound again, so OCC TIMER and U/S DLY are reset again and the lights remain on.

At time t7 no other sources of ultrasound are detected, so U/S DLY and OCC TIMER are allowed to continue decrementing. At time t8, U/S DLY reaches zero, the ultrasound driver is energized, and the system begins continuously checking for occupants in response to reflected energy from the ultrasound driver. No occupants are detected between time t8 and the time OCC TIMER reaches zero at time t9. Therefore, the lights are turned off and the ultrasound driver remains energized to enable the system to continue checking for occupants entering the monitored space. Immediately after turning off the lights, the system enters a short false-unoccupied detection period between time t9 and time t10 during which the detector operates at a higher level of sensitivity, i.e., it looks for smaller motions. No small movement is detected during the false-unoccupied detection period, and therefore, at time t10, the occupancy sensor enters the normal unoccupied mode.

The inventive principles of this patent disclosure have been described above with reference to some specific example embodiments, but these embodiments can be modified in arrangement and detail without departing from the inventive concepts. Such changes and modifications are considered to fall within the scope of the following claims.

The invention claimed is:

1. A method comprising:
    energizing an ultrasound driver to emit ultrasonic energy in space;
    sensing ultrasonic energy within the space;
    determining an occupancy condition of the space in response to sensing ultrasonic energy reflected from the ultrasound driver;
    determining the occupancy condition of the space in response to sensing ultrasonic energy in the space that was not emitted by the ultrasound driver;
    wherein sensing ultrasonic energy in the space that was not emitted by the ultrasound driver comprises:
    de-energizing the ultrasound driver during a first time period; and
    sensing ultrasonic energy within the space during the first time period.

2. The method of claim 1 wherein sensing ultrasonic energy within the space during the first time period comprises sensing ultrasonic energy from an electronic writing board.

3. The method of claim 1 further comprising de-energizing the ultrasound driver for a second time period in response to sensing ultrasonic energy in the space that was not emitted by the ultrasound driver.

4. The method of claim 1 further comprising controlling an electrical load for the space in response to the occupancy condition.

5. The method of claim 4, wherein controlling an electrical load comprises controlling a light.

6. The method of claim 5, wherein controlling the light comprises turning the light on.

7. The method of claim 5, wherein controlling the light comprises turning the light off.

8. The method of claim 7, further comprising energizing the driver within a predetermined time period after turning the lights off.

9. The method of claim 8, wherein energizing the driver further comprises setting a detection threshold at a first level for a first period of time that starts immediately after turning the lights off.

10. The method of claim 9, wherein energizing the driver further comprises setting the detection threshold at a second level for a second period of time, where the second level is higher than the first level.

11. The method of claim 1 further comprising checking for a presence of other sources of ultrasound energy prior to energizing the ultrasound driver.

12. A method comprising:
emitting ultrasonic energy in a space, wherein the ultrasonic energy is emitted via an ultrasound driver;
sensing ultrasonic energy within the space;
determining an occupancy condition in the space in response to sensing ultrasonic energy reflected from the ultrasound driver;
controlling an electrical load for the space in response to the occupancy condition;
de-energizing the ultrasound driver during a first time period;
sensing ultrasonic energy within the space during the first time period, wherein the ultrasonic energy is emitted from a source other than the ultrasonic driver;
determining the occupancy condition in the space in response to sensing ultrasonic energy reflected from the source other than the ultrasonic driver; and
controlling the electrical load for the space in response to the occupancy condition.

13. The method of claim 12, wherein the presence of ultrasound energy from a source other than the ultrasonic driver comprises energy from a white board.

* * * * *

UNITED STATES PATENT AND TRADEMARK OFFICE
CERTIFICATE OF CORRECTION

| | | |
|---|---|---|
| PATENT NO. | : 8,698,624 B2 | Page 1 of 1 |
| APPLICATION NO. | : 13/943223 | |
| DATED | : April 15, 2014 | |
| INVENTOR(S) | : Robert L. Hick | |

It is certified that error appears in the above-identified patent and that said Letters Patent is hereby corrected as shown below:

IN THE SPECIFICATION
In column 6, line 5, replace "PR" with -- PIR --;
In column 6, line 35, replace "to" with -- t0 --;
In column 7, line 2, replace "to" with -- t0 --;
In column 7, line 43, replace "to" with -- t0 --.

Signed and Sealed this
First Day of March, 2016

Michelle K. Lee
*Director of the United States Patent and Trademark Office*